(12) United States Patent
Babbar et al.

(10) Patent No.: US 8,364,850 B2
(45) Date of Patent: Jan. 29, 2013

(54) UTILITY SERVICE IN MULTI-PROCESSOR ENVIRONMENT

(75) Inventors: Uppinder Singh Babbar, San Diego, CA (US); Satish Vangala, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 11/780,467

(22) Filed: Jul. 19, 2007

(65) Prior Publication Data

US 2008/0181220 A1 Jul. 31, 2008

Related U.S. Application Data

(60) Provisional application No. 60/832,347, filed on Jul. 20, 2006.

(51) Int. Cl.
G06F 15/16 (2006.01)
(52) U.S. Cl. ...................................... 709/250
(58) Field of Classification Search .................. 709/217, 709/218, 219, 250
See application file for complete search history.

(56) References Cited

U.S. PATENT DOCUMENTS

| | | | |
|---|---|---|---|
| 6,463,064 B1 * | 10/2002 | Broockman et al. | 370/401 |
| 6,847,610 B1 * | 1/2005 | Suumaki et al. | 370/230.1 |
| 7,130,291 B1 * | 10/2006 | Kim et al. | 370/341 |
| 7,254,405 B2 | 8/2007 | Lin et al. | |
| 2003/0028818 A1 * | 2/2003 | Fujita | 714/4 |
| 2003/0086435 A1 * | 5/2003 | Cooley et al. | 370/431 |
| 2004/0062262 A1 | 4/2004 | Venteicher et al. | |
| 2004/0131057 A1 * | 7/2004 | Miyashita | 370/389 |
| 2004/0203664 A1 | 10/2004 | Lei et al. | |
| 2005/0152298 A1 | 7/2005 | Thubert et al. | |
| 2006/0031393 A1 * | 2/2006 | Cooney et al. | 709/217 |
| 2006/0126547 A1 | 6/2006 | Puuskari et al. | |
| 2006/0129670 A1 * | 6/2006 | Mayer | 709/223 |
| 2006/0129676 A1 * | 6/2006 | Modi et al. | 709/227 |

(Continued)

FOREIGN PATENT DOCUMENTS

| | | |
|---|---|---|
| JP | 2006501772 T | 1/2006 |
| JP | 2006072969 A | 3/2006 |

(Continued)

OTHER PUBLICATIONS

3GPP CT WG3: "Digital cellular telecommunications system (phase 2+); Universal Mobile Telecommunications System (UMTS): Packet domain; Mobile Station (MS) supporting Packet Switched services (3GPP TS 27.060 version 6.0.0 Release 6); ETSI TS 127 060" ETSI Standards, European Telecommunications Standards Institute, Sophia-Antipo, FR, vol. 3-CN3, No. V600, Jun. 2004, pp. 1-34, XP014027798 ISSN: 0000-0001.

(Continued)

*Primary Examiner* — Jason Recek
(74) *Attorney, Agent, or Firm* — James T. Hagler

(57) ABSTRACT

Methods and systems for telecommunication devices to share a network connection between a utility engine and an application. While the outgoing data of the utility engine and the application are merged over the shared network connection, incoming data is filtered via an IP data filter to route utility engine specific data to the utility engine while allowing all other data to pass through for use by the application. Numerous utilities may be supported by different forms of utility engines. Among such utilities include GPS service, where GPS related data may be received from a GPS server and utilized by applications which provide location specific information based on a location determined by the GPS server.

44 Claims, 11 Drawing Sheets

U.S. PATENT DOCUMENTS

| | | | |
|---|---|---|---|
| 2007/0005765 A1* | 1/2007 | Lamb et al. | 709/225 |
| 2007/0206553 A1* | 9/2007 | Khushu et al. | 370/338 |
| 2007/0211690 A1* | 9/2007 | van Megen et al. | 370/351 |
| 2007/0244573 A1* | 10/2007 | McFarland | 700/20 |
| 2007/0245005 A1* | 10/2007 | Banerjee et al. | 709/223 |
| 2009/0100307 A1* | 4/2009 | Lee | 714/746 |

FOREIGN PATENT DOCUMENTS

| | | |
|---|---|---|
| TW | 200612335 | 4/2006 |
| WO | WO0027060 A1 | 5/2000 |
| WO | 0117291 | 3/2001 |

OTHER PUBLICATIONS

International Search Report—PCT/US07/074041, International Search Authority—European Patent Office—Jan. 25, 2008.

Written Opinion—PCT/US07/074041, International Search Authority—European Patent Office—Jan. 25, 2008.

International Preliminary Report on Patentability—PCT/US07/074041, International Search Authority—European Patent Office—Oct. 22, 2008.

Taiwan Search Report—TW096126689—TIPO—Dec. 22, 2011.

\* cited by examiner

Fig. 9

- 71 — The packet data (PD) manager registers with the connection sharing manager to manage shared packet switched (PS) data connections.
- 72 — A first application requests services from a utility engine. The PD manager forwards this request through the PD API to the connection sharing manager.
- 73 — The connection sharing manager informs the PD manager to bring up the requested interface. The PD manager receives requested parameters from the connection sharing manager.
- 74 — The PD manager starts a PS data call through the connection manager.
- 75 — The connection manager requests activation of a network interface based on step 84. If the interface already is active, the modem processor will returns a success result.
- 76 — The connection manager queries the network for actual final network interface parameters and returns them to the PD manager.
- 77 — The PD manager informs the connection sharing manager that the network is ready for transmissions to or from a utility server on the network.
- 78 — The connection sharing manager identifies the network interface opened using the information from application processor. The connection sharing manager binds a utility engine to this interface for sending and receiving utility-related IP traffic.
- 79 — Outbound utility-specific IP traffic is merged with outbound application-specific IP traffic. The IP filter routes inbound utility-specific traffic to the appropriate utility and routes inbound non-utility traffic on to the application processor.
- 72A — If another application requests services through the PD manager, the PD manager passes this request through the PD API to the connection sharing manager. The PD manager or connection sharing manager increments the count of applications needing service from the utility engine providing the services.
- 80 — If an application notified the PD manager that it no longer needs services or if an application has not requested services for a period of time (timed-out), the connection sharing manager decrements the count of applications requiring those services. Is the count equal to zero?
  - yes ↓
  - no → go to 79
- 81 — The PD manager notifies connection manager that the PS data call is no longer shared with a utility engine and to close the PS data call if no other application is using it. PD manager notifies PD API to stop the utility engine.
- 82 — The PD API notifies the connection sharing manager that the PS data call is closed and to stop the utility engine and the IP filter from filtering traffic intended for the utility engine.

UTILITY SERVICE IN MULTI-PROCESSOR ENVIRONMENT

CROSS-REFERENCE TO RELATED APPLICATIONS

This application claims priority to U.S. Provisional Patent Application Ser. No. 60/832,347, titled "GPS service in multi-processor multi-mode environment", filed on Jul. 20, 2006, incorporated by reference herein in its entirety.

FIELD OF THE INVENTION

The present invention relates to methods and systems for transmitting and/or receiving GPS-specific information and application-specific information over a single, shared network connection.

BACKGROUND OF THE INVENTION

The increased mobility of telecommunication devices (wireless modem equipped laptops, PDA devices, smart phones, etc.) has spawned software applications which may provide or utilize location-relative information. Such applications, for example, may include up-to-date digital maps, addresses of nearby facilities (like restaurants, businesses, and shops), local weather forecasts, listing of nearby entries from a personal address book, or local geographic data. The software applications themselves run on an application processor but may utilize external GPS (Global Positioning System) information to acquire the device's position as input for the various location-based applications.

Complex, GPS-enabled mobile devices, especially those with multiple processors, may need a way to share or multiplex a given network connection between GPS-related data traffic and application-related data traffic. This may be because only one point-to-point (PPP) connection is available for a given network at one time.

SUMMARY OF THE INVENTION

An embodiment of a mobile telecommunications device (mobile device) may include one or more processors, including at least one application processor as well as at least one modem processor which may support the implementation of a utility or service required by one or more applications running on the application processor. The application processor may manage and execute a number of software application programs as well as control the user interface. The modem processor may manage the radio frequency physical resources and the lowest level radio and protocol link to one or more fixed base stations, the associated networks, and the network servers. The modem processor may also provide an application programming interface (API) for the mutual interaction between the application processor and the modem processor. An example of such utility or a service is a GPS engine coupled to or running within a modem that provides GPS services to applications running on the application processor. Utilities or services available on one processor, such as a modem processor, may need to access an external data source as part of their functioning at the same time that applications running on the application processor are accessing a different external data source. This situation creates routing issues to enable multiple applications to access external networks simultaneously. To solve this routing issue, an embodiment includes an IP data filtering mechanism to enable simultaneous data transfer by two applications accessing different external servers. Further, an embodiment provides an application interface for sharing the common service information (like GPS coordinate information) among a number of applications.

In another embodiment, one or more utility engines running on the modem processor requires access to a network connection. To do so, the utility engine may need to select among various network connections and share one or more active data network connections with an application running on the application processor. To share a data network connection with an application program, the utility engine may initiate an IP data filter to monitor packet data traffic over the shared data network connection. The filter routes to the utility engine all data packets that are relevant to the utility engine and routes all other data packets to the application sharing the network connection.

BRIEF DESCRIPTION OF THE DRAWINGS

The accompanying drawings, which are incorporated herein and constitute part of this specification, illustrate presently preferred embodiments, and, together with the general description given above and the detailed description given below, serve to explain features of the embodiments.

FIG. 9 is a process flow diagram illustrating the sequence of steps for an embodiment with one or more utility engines.

DETAILED DESCRIPTION

Figure 1:
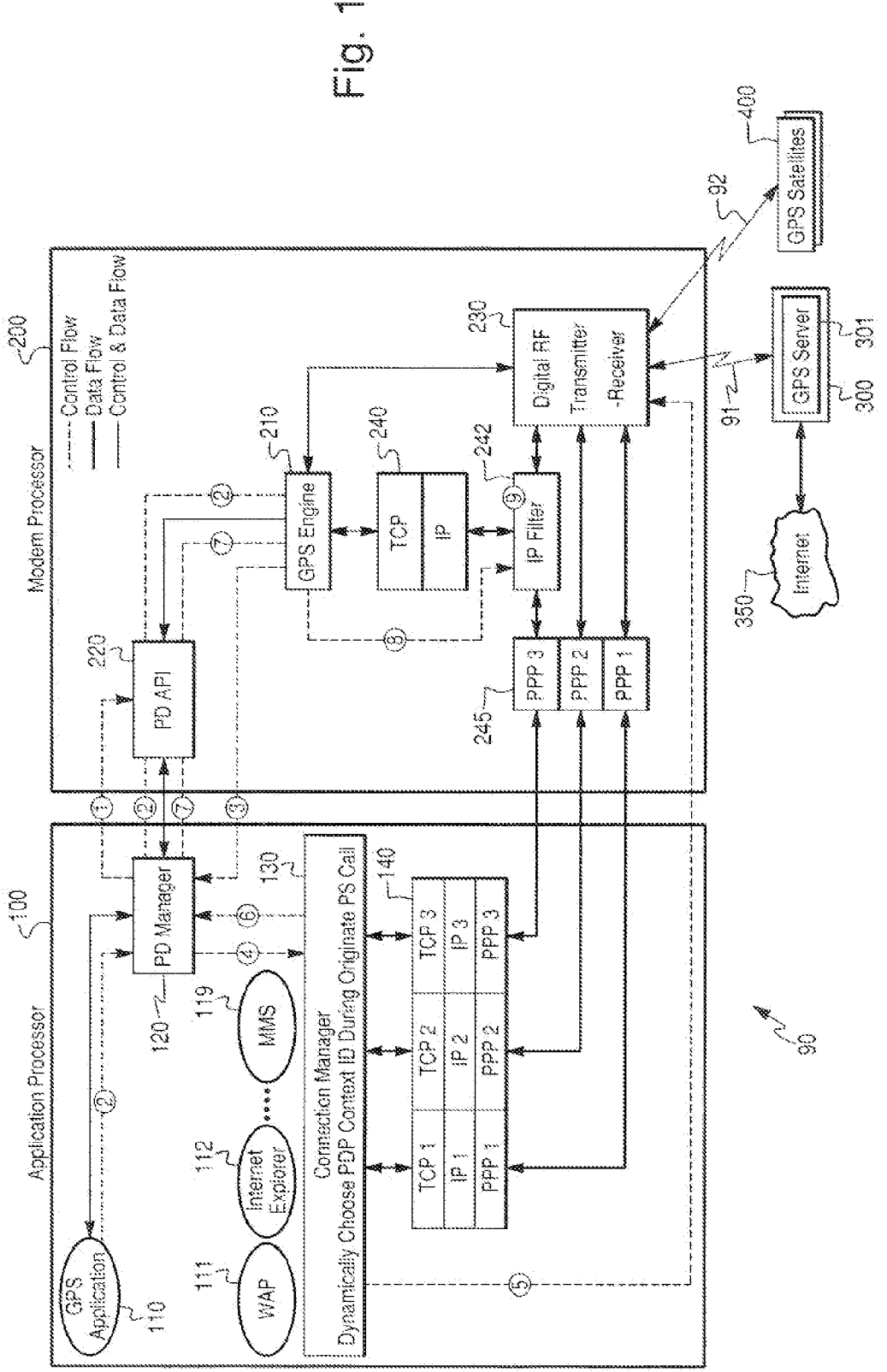
FIG. 1 illustrates a system block diagram of an embodiment including an application processor managing multiple data network connections and a modem processor having a GPS engine.

Various embodiments of the present invention will be described in detail with reference to the accompanying drawings. Wherever possible, the same reference numbers will be used throughout the drawings to refer to the same or like parts.

An embodiment mobile device may include one or more processors, including at least one application processor as well as at least one modem processor. The at least one modem processor may support the implementation of at least one utility engine. A utility engine is a process or circuit/process that provides services or data that are utilized by a number of applications. A GPS engine is an example of a utility engine since the geographic location information it generates may be used by a number of location-related applications. The application processor may manage and execute a number of software application programs as well as control the user interface. The at least one modem processor may manage the radio frequency physical resources and the lowest level radio and protocol link to one or more fixed base stations, the associated networks, and the network servers. A modem processor may also provide an application programming interface (API) for the mutual interaction between the at least one application processor and the modem processor.

A GPS engine may run on the modem processor since the modem processor possesses radio frequency receiver resources which may be co-opted and utilized to receive signals from one or more GPS satellites. Upon receiving the satellite signals, the GPS engine may send the information over a shared network connection to a remote GPS server processor. The remote GPS server processor may be capable of calculating the location of the mobile device based upon information received from the GPS engine. Once the mobile device's location is determined, the GPS server or some other network resource may also provide the mobile device with other supplementary information based on the determined mobile device location. Examples of such supplementary information include, but are not limited to, up-to-date digital maps, addresses of nearby facilities (like restaurants, businesses, and shops), local weather forecasts, a listing of nearby entries from an address book, or local geographic data. Such supplementary information may not otherwise be available locally on the mobile device.

Due to the volume of data manipulated, the GPS engine on the modem processor may use a packet-switched data network connection to communicate with the remote GPS server. Packet-switching data networks enable improved data transmission rates compared to conventional circuit switching. Packet switched data network connections are available on 2G and 3G mobile telecommunications devices. For example, Universal Mobile Telecommunication System (UMTS) devices are 3G devices which are packet switched devices.

A PDP (Packet Data Protocol, e.g. IP, X.25, FrameRelay) context is a data structure present on UMTS devices which contains the subscriber's session information when the subscriber has an active session (i.e., periods of interactions between computer systems). When a mobile device wants to use UMTS, it must first attach and then activate a network profile. Such a network profile may be, but is not limited to a PDP context. This allocates a network profile data structure in the Serving GPRS Service Node (SGSN) that the subscriber is currently visiting and the Gateway GPRS Service Node (GGSN) serving the subscribers access point. UMTS allows for multiple network profile support. Thus, multiple network connections may be maintained by the UMTS device to support multiple applications.

However, in a UMTS environment with multiple PDP (Packet Data Protocol) context support, a utility service, such as a GPS service, may be available on only one network profile. The GPS engine on the modem may be configured with the particular network profile associated with the GPS server. In instances where the network profile supporting a utility engine (e.g., a GPS engine) is already in use by another application process, the utility engine may "piggyback on", or share, the data network connection with an application running on the application processor.

The utility engine itself, a connection manager, or another software module may select the appropriate data network connection to be shared. As only one IP address is assigned to the mobile device during PDP activation from a given domain, there may be routing issues in attempting to support simultaneous data transfer between the network and one or more applications on the multiple processors. To solve this routing issue, an embodiment can include an IP data filtering mechanism for simultaneous data transfer of the utility engine specific information and the application specific information. Further, an embodiment may provide an application interface to share the location information among the applications.

Figure 7:
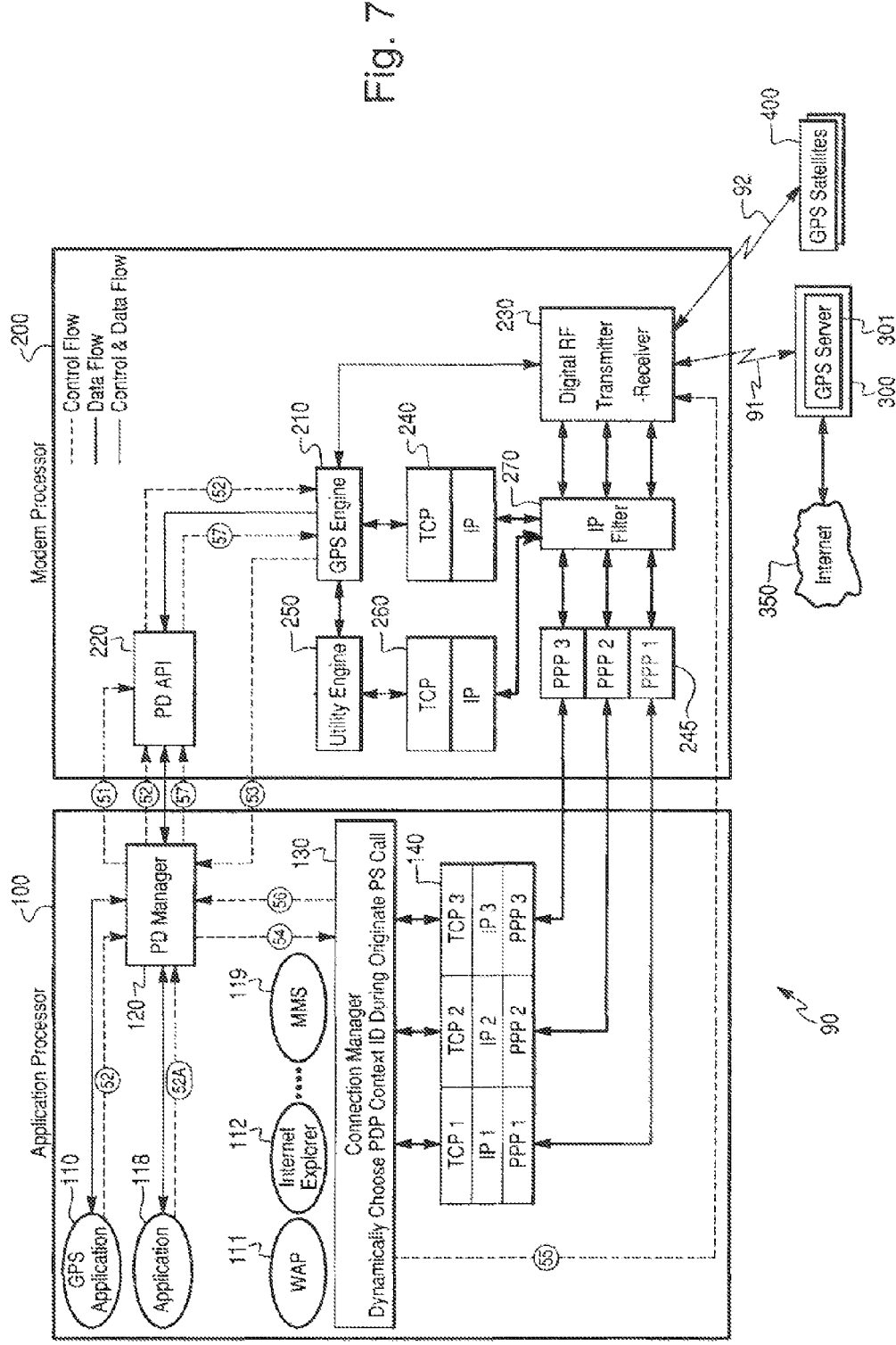
FIG. 7 illustrates a system block diagram of an embodiment including an application processor managing multiple data network connections and a modem processor having a GPS engine and a utility engine.

A variety of utility engines may be used by a mobile device including, for example, a GPS engine. For ease of illustration, the organization and functioning of various embodiments are first described with reference to a GPS engine because the GPS service is an example of a utility service that can be used by a number of applications and require simultaneous network connection to an external data source (i.e., a GPS server). Embodiments of mobile devices having a general utility engine or engines are then described with reference to FIGS. 7-9.

In a multimode mobile device, such as a cellular telephone, handset, or laptop modem, there can be several networks available and several packet data network connections for the transmission and reception of data. In addition, a multimode mobile device may have access to multiple wireless networks employing a variety of wireless technologies (e.g., 1x, EvDO, UMTS, WLAN, and WiFi) and multiple IP networks (e.g., IPv4, IPv6). While UMTS networks can support connectivity to multiple domains simultaneously, only one of the data network connections may support a GPS service. In such multiple data network connection scenarios, the multimode mobile device may identify a data network connection supporting the GPS service over the network. Once that data network connection is identified, the data network connection may be assigned to the GPS engine for receiving the GPS service.

However, the data network connection supporting the GPS service may also provide remote services for other GPS and non-GPS service applications, such as Internet connectivity. Specifically, a data network connection which supports the GPS service may need to be shared between an application program and a GPS engine running simultaneously on the multimode device. The application program need not be a GPS application. The only relationship between the GPS engine and the application program sharing the data network connection may be that both need essentially simultaneous access to the same data network connection. A connection manager may be used by the mobile device to allocate a limited number of possible data network connections and to manage the sharing of a data network connection.

Specifically, in a UMTS environment with multiple PDP support, the mobile device can have multiple network profiles active simultaneously. One network profile, which may include the IP address of the GPS service, may be required by the GPS engine. The network profile parameters may include a network profile number, an APN name, a PDP type, an IP network family (v4 or v6), and a technology type (e.g., CDMA/EV-DO, GSM/GPRS, UMTS, WLAN, etc.). For some types of devices (i.e., form factors), such as PDAs, smart phones, and modems embedded in laptops, the parameter settings may be configured on the application processor and all the packet data connections may be allocated by the application processor. The parameter settings can alternatively be allocated by the modem processor, such as in the case of a standalone cell phone or a cell phone acting as a modem for a tethered laptop computer.

Meanwhile, an application program, not necessarily related to GPS, may require access to the same data network connection related to the network profile of the GPS engine.

That is, the application program and the GPS engine need to share the same packet data call.

FIG. 1 illustrates a system block diagram of an embodiment including an application processor managing multiple data network connections and a modem processor having a GPS engine. As shown in FIG. 1, a mobile device 90 may include one or more processors 100, 200 and a GPS engine 210. In the illustrated embodiment, the mobile device 90 has at least one application processor 100 and a modem processor 200.

The application processor 100 may manage and execute a number of software application programs. For example, the application processor 100 may manage at least a GPS application 110, a wireless application protocol (WAP) application 111, an Internet Explorer application 112, and a Multimedia Message Service (MMS) application 119, as well as other software applications. The application processor 100 may also control the user interface through a display and keypad or keyboard (not shown).

The modem processor 200 may manage the radio frequency physical resources and lowest level radio and protocol link 91. The radio and protocol link 91 may provide wireless communications with one or more wireless communication networks 300. The modem processor 200 may also provide an API (applications programming interface) 220 to the application processor 100 for the mutual control and data interactions between the application processor 100 and modem processor 200.

Wireless communication networks 300 to which the modem processor 200 establishes communication links typically include at least one fixed base station and at least one data server (not shown). The at least one data server may itself be or may include a GPS server 301.

FIG. 1 illustrates an embodiment in which both the application processor 100 and the modem processor 200 are contained within the same integral unit, such as a smart phone or a PDA (personal data assistant). Alternatively, the application processor 100 and modem processor 200 may be in separate units. For example, a laptop computer may be tethered to a cell phone acting as a modem, In such an instance, the application processor 100 is located in the laptop computer, while the modem processor 200 is in the GPS-enabled cellular phone or wireless adaptor connected to the laptop. In this example alternative configuration, the local connection linking the laptop and the phone/adaptor may be a wired cable, a Bluetooth link, or an infrared linkage, for example, through which control messages and data flow.

A GPS engine 210 may be a software module running on the modem processor 200. Alternatively, the GPS engine 210 may be in the form of hardware or firmware, such as an ASIC chip. The GPS engine 210 may share and utilize the radio frequency transceiver (transmitter-receiver) 230 found within the modem processor 200 in order to receive wireless signals 92 from one or more GPS satellites 400. That is, the receiver resources of the radio frequency transceiver 230, normally used for network communication, may be time-shared or temporarily co-opted for GPS satellite signal reception. This may include portions of the transceiver 230 circuitry, such as amplifiers or filters, memory units and data connection and routing circuits, or time sharing of central transceiver circuits and functions, such as temporarily changing reception frequencies and the manner of signal decoding of the transceiver 230 in order to receive GPS satellite time signals.

Upon receiving and decoding the GPS satellite signals from a sufficient number of satellites 400, the GPS engine 210 processes the GPS satellite signals into a digital data form to be transmitted through a TCP/IP or similar communication stack 240.

The processed digital data signal can then be transmitted through the radio transceiver 230 over the wireless communications network 300 to a GPS server 301. The GPS server 301 may further process the GPS satellite signals received from the GPS engine 210 to determine the location coordinates of the mobile device 90 and/or additional supplementary location information. Location data determined by the GPS server 301 is then transmitted back to the GPS engine 210 over the wireless communications network 300. Such location-relative information may not otherwise be available locally on the mobile device 90. The information provided by the GPS server 301, for example, may identify the mobile device's location with respect to a street address, city, county, country or other political region. Because the modem processor 200 located within the mobile device may lack sufficient hardware to perform the non-trivial, time-consuming, high precision, 3-dimensional geometrical computation, the mobile device may seek to offload such computations to an external GPS server 301 instead of performing the calculations on the modem processor 200 which may lack a built-in hardware floating point arithmetic unit. Thus embodiments of the GPS Engine 210 may require access to a data network connection to send and receive necessary GPS data to the GPS server 301.

To communicate with the external GPS server 301, the GPS engine 210 on the modem processor 200 requires a data network connection, such as implemented by a software communication stack 240. Specifically, in a UMTS environment with multiple network profile support, the GPS service may be available on only one network profile. The GPS engine 210 on the modem processor 200 may be configured with the particular network profile associated with a specific GPS server 301. This specific configuration or provisioning information may need to be passed from the GPS engine 210 to the connection manager 130. While there can be a direct information path to do that, a well-designed packet data (PD) application interface 220 may pass that information through the packet data manager 120 in a more structured and disciplined software protocol.

To support GPS location services as well as other application programs running on the application processor 100, the GPS engine 210 may need to share one of potentially several data network connections 140 with the application processor 100. This is because only one IP address may be assigned to the device 90 during PDP activation from a given domain. Therefore, there may need to be some other way of correctly routing data packets from the wireless communications network 300 to the GPS engine 210 as well as the one or more application programs 110, 111, 112, . . . 119 executing on the application processor 100.

To solve this routing issue, an embodiment may include an IP data filter 242 for simultaneous data transfer of the GPS specific information and the application specific information over the same data network connection—that is, by sharing the one assigned IP address. The filter 242 is a software module which specifically monitors data packets watching for data packets having a specific, expected format or content. In the example embodiment illustrated in FIG. 1, the IP data filter is configured to specifically watch for and separate out GPS-related data packets from the GPS server 301. The GPS-related format or content may include a TCP port number and an IP address or other unique content which identifies the data packet as originating from the GPS server 301 based upon the source address in the data packet. If the IP data filter 242 identifies a packet as being GPS-related, the packet is passed to the GPS engine 210. Otherwise, the IP data filter 242 passes the packet as-is to the application program which is sharing the PDP activation, the network connection, and the IP address. Operating in a similar manner, the IP data filter 242 can also allow more than one application program on the device 90 to share the same PDP activation, network connection, and IP address.

An embodiment may employ the following procedure for sharing the information about the data network connection selection between the connection manager 130 and the GPS engine 210. While the connection manager 130 is in charge of allocating data network connections, the GPS engine 210 may need to dictate which PDP activation to use for receiving GPS data services. That is, there may need to be informative "handshaking" between these software entities on the separate processors.

The data network connection which is shared with the GPS engine 210 may not be the same data network connection that the GPS Application 110 may be using. That is, the GPS engine 210 may be sharing a data network connection with some other application which requires access to a network resource. For example, the GPS Engine 210 may require a specific PDP activation, data network connection, and IP address for communication with a GPS server 301. However, the GPS application 110 initiating the GPS location fixes may be accessing a network resource on a different network and therefore through a different PDP activation and network connection. The network resource, for example, may be a source of map graphics or geographical data.

The operation of an exemplary embodiment is explained with reference to both FIGS. 1 and 2. FIG. 1 shows the various interacting components of an application processor, a modem processor, and a network's GPS server along with the control and/or data flow paths connecting the components. The control and data paths in FIG. 1 are identified by the number of the corresponding functional step shown in FIG. 2 which precipitates information flow over the control and/or data flow path.

In step 1, the packet data manager 120 requests a service from the GPS engine 210 through the packet data applications programming interface (PD API) 220 in the modem processor 200. As part of this step, the packet data manager 120 may obtain communication parameters from the GPS engine 210, such as the provisioned network connection that provides the required GPS service, the desired interface family type, or whether a GPS fix session is already in progress. In this manner, the packet data manager 120 may identify the network connections that support GPS data. This control flow step 1 begins the management of PS (packet switched) data connections.

In step 2, a user may activate an application which requires GPS location information. For example, the user may employ his/her mobile device 90 to obtain driving directions to the nearest golf course. Activating a GPS application 110 stored on the mobile device 90, causes a request to be sent to the packet data manager 120 to initiate a GPS location fix session to determine the location of the mobile device 90. The packet data manager 110 in turn may send a signal to the packet data API 220 so that the request to determine the location of the mobile device 90 is forwarded to the GPS engine 210. If the data network connections which support the GPS services have already been identified in step 1, the packet data manager 120 may send a signal to the GPS engine 210 informing the GPS engine 210 of the identified data network connection to be used.

In step 3, the GPS engine 210 attempts to initiate a packet switched data call. To do so, the GPS engine 210 signals the packet data manager 120 to initiate the requested network interface (CDMA, UMTS, WLAN, . . . ). The requested interface (such as a provisioned UMTS PDP context) is one that is appropriate to connect the GPS engine 210 to a GPS server 301 over a wireless communications network 300. The GPS engine 210 may provide the packet data manager 120 with the requested interface name, family type, and technology to perform the packet switched data call. Besides specifying CDMA, UMTS, WLAN, etc., the GPS engine 210 may also request a specific IP version (IPv4, IPv6, etc.). For UMTS in particular, the GPS Engine 210 may provide the access point name (APN), the PDP type (e.g. IP, X.25, FrameRelay), the desired quality of service (QoS), etc. as parameters of the interface request. These parameters may be needed to fully establish a data network connection to a specific server.

In step 4, the packet data manager 120 requests initiation of a packet switched (PS) data call through the connection manager 130. Parameters for making the data call may be obtained from the GPS engine 210 in step 3 and passed to the connection manager 130. Alternatively, the data call parameters, such as the APN name, PDP type, IP family etc., may be provisioned internally by the network provider. In response, the connection manager 130 directs the modem processor 200 to call the appropriate available interface based on the parameters provided by the packet data manager 120.

In step 5, the connection manager 130 requests activation of an appropriate available network interface through the RF transceiver (transmitter-receiver) 230 based on the selection parameters provided by the packet data manager 120 in step 4. The parameters provided by the packet data manager 120 may be different each time a data call is initiated. The parameters may vary depending on the location of the mobile device 90 and the available network or networks.

In step 6, once an appropriate network interface connection 91 is active through the RF transceiver unit 230, the connection manager 130 queries the wireless communications network 300 for final interface parameters and returns this information (APN, Device IP address, Type of call) to the packet data manager 120.

In step 7, the packet data manager 120 informs the GPS Engine 210 via the packet data API 220 that the packet switched data call was successfully opened. The packet data manager 120 then provides the GPS engine 210, via the packet data API 220, with the necessary network information for the GPS engine 210 to access the GPS server 301. The network information for the GPS engine 210 may include the connection request information generated above in step 3. This information may include the interface name/technology (CDMA, UMTS, WLAN, etc.), the interface family (IPv4, IPv6, etc.), and the interface specific information (for UMTS, the APN name, the PDP type, the QoS, the domain name, the services supported by domain, etc.). In addition, the network information may include the interface IP address that was assigned for the data call session.

In step 8, the GPS engine 210 uses the provided network interface parameters to uniquely identify the network interface brought up using the network information from packet data manager 120 of the application processor 100. The GPS engine 210 binds to the network interface for sending and receiving IP traffic for GPS location fixes through the TCP/IP communication stack 240 and the IP data filter 242.

In step 9, the network GPS information is automatically extracted from the IP data traffic using the IP data filter 242 and the TCP/IP communication stack 240. That is, GPS-related received data traffic is stripped out, or filtered, by the IP data filter 242 and routed to the GPS engine 210. Specifically, every incoming data packet of an expected, specific GPS-related form is diverted to the GPS Engine through the communication stack 240. Any other data packet received on the same network connection is not routed through the communication stack 240, but is routed to the application processor 100, such as through a PPP interface 245. This routing may occur transparently to the user. Any data transmitted by the GPS engine 210 is merged, or interleaved, with data transmitted from the application processor 100 over the same network connection.

In step 10, an application using GPS services determines whether further GPS location fixes are required. If so, steps 9 and 10 are repeated an indefinite number of times.

In step 11, if no more GPS location fixes are required, the GPS application 110 notifies the packet data manager 120 to halt the session with the GPS server. Alternatively, the packet data manager 120 may detect that the GPS application 110 has not requested GPS location fixes for a period of time. Such a time-out period may be necessary in mobile devices where applications may never be explicitly terminated by the user. In either case, the packet data manager 120 notifies the connection manager 130 that the packet switched data call is no longer to be shared with the GPS Engine 210. If the packet switched data call is no longer being shared with some application program, the call is terminated. If the packet switched data call is in use by some application program, the call is not terminated by the connection manager 130, and operation of the application processor 100 continues as normal.

In step 12, the packet data API notifies the GPS engine that the packet switch data call has been terminated and terminates the IP data filter 242 since there is no further need to filter out GPS-related data packets.

FIG. 1 shows interconnections between the application processor 100 and the modem processor 200 at the PPP (point-to-point protocol) level 245. It should be noted that while FIG. 1 depicts the interconnections 140, 245 to be PPP, it is not intended to limit to the interconnections to PPP. The processors 100, 200 could also be interconnected directly at the IP level, through Ethernet or any other link layer interface or proprietary interface.

The GPS engine 210 may also communicate with a GPS application program 110 at a higher level, such as at a TCP protocol level or at a level higher in the open systems interconnect (OSI) hierarchy.

Figure 3A:
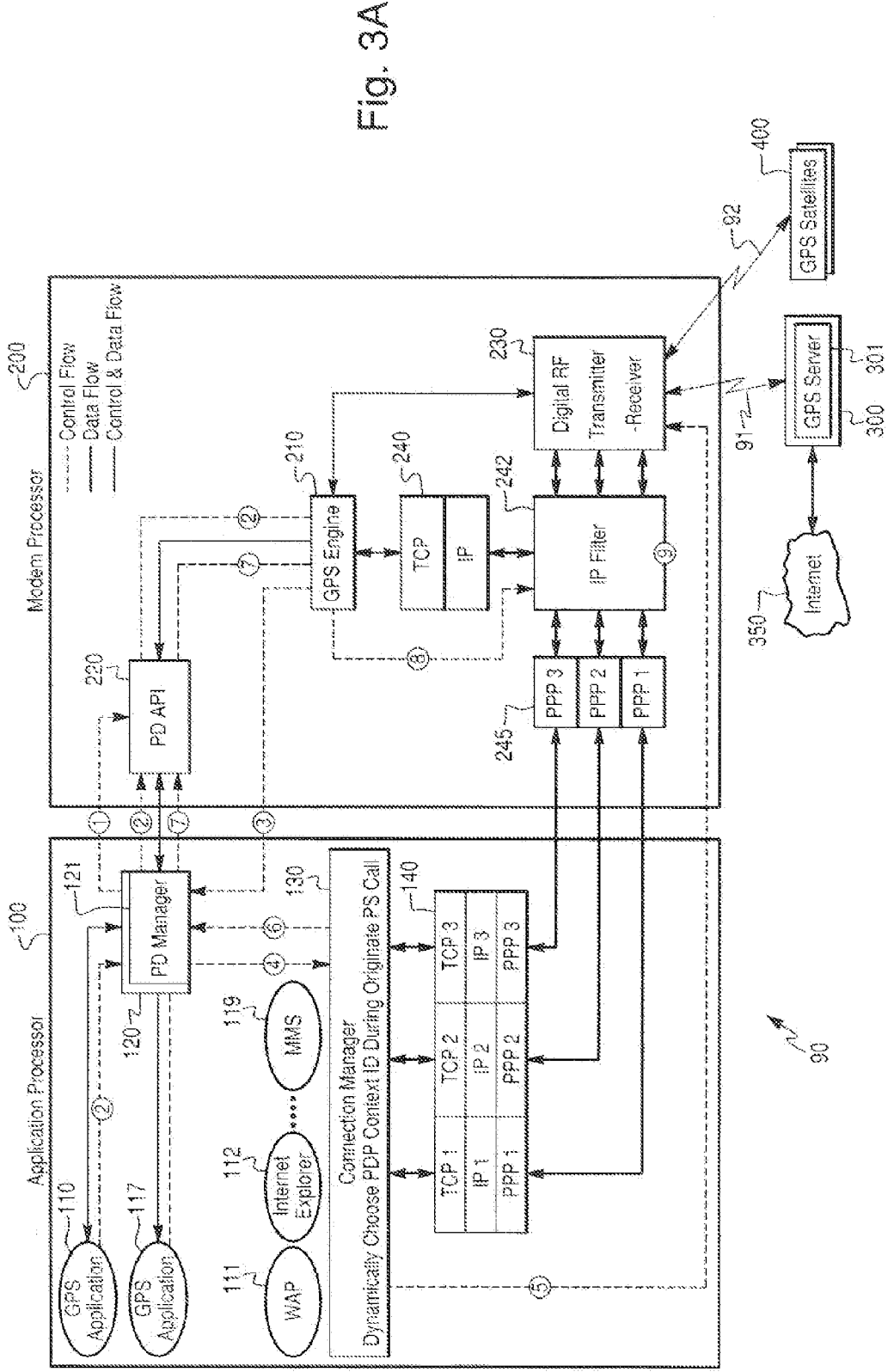
FIGS. 3A, 3B, 4A, and 4B illustrate system block diagrams of alternative embodiments with one or more GPS applications.

FIG. 3A illustrates an embodiment having at least one additional GPS application program 115. FIG. 3A shows two GPS applications 110, 115 executing on the same application processor 100, but there may be even more GPS applications (not shown) running on the same application processor 100. Alternatively, the various GPS applications 110, 115 may be executing on more than one application processor if more than one is present. Two application processors are included in the embodiment shown in FIG. 3B. For example, a mobile device may contain a "dual core" or even a "quad core" processor chip, itself containing two or more processing units.

As shown in FIG. 3A, the IP data filter 242 of the alternative embodiment may examine packets on more than one network connection at a time as opposed to examining a single network connection as shown in the embodiment of FIG. 1. Such a configuration permits the sharing or piggybacking of more than one network connection at a time.

Figure 2:
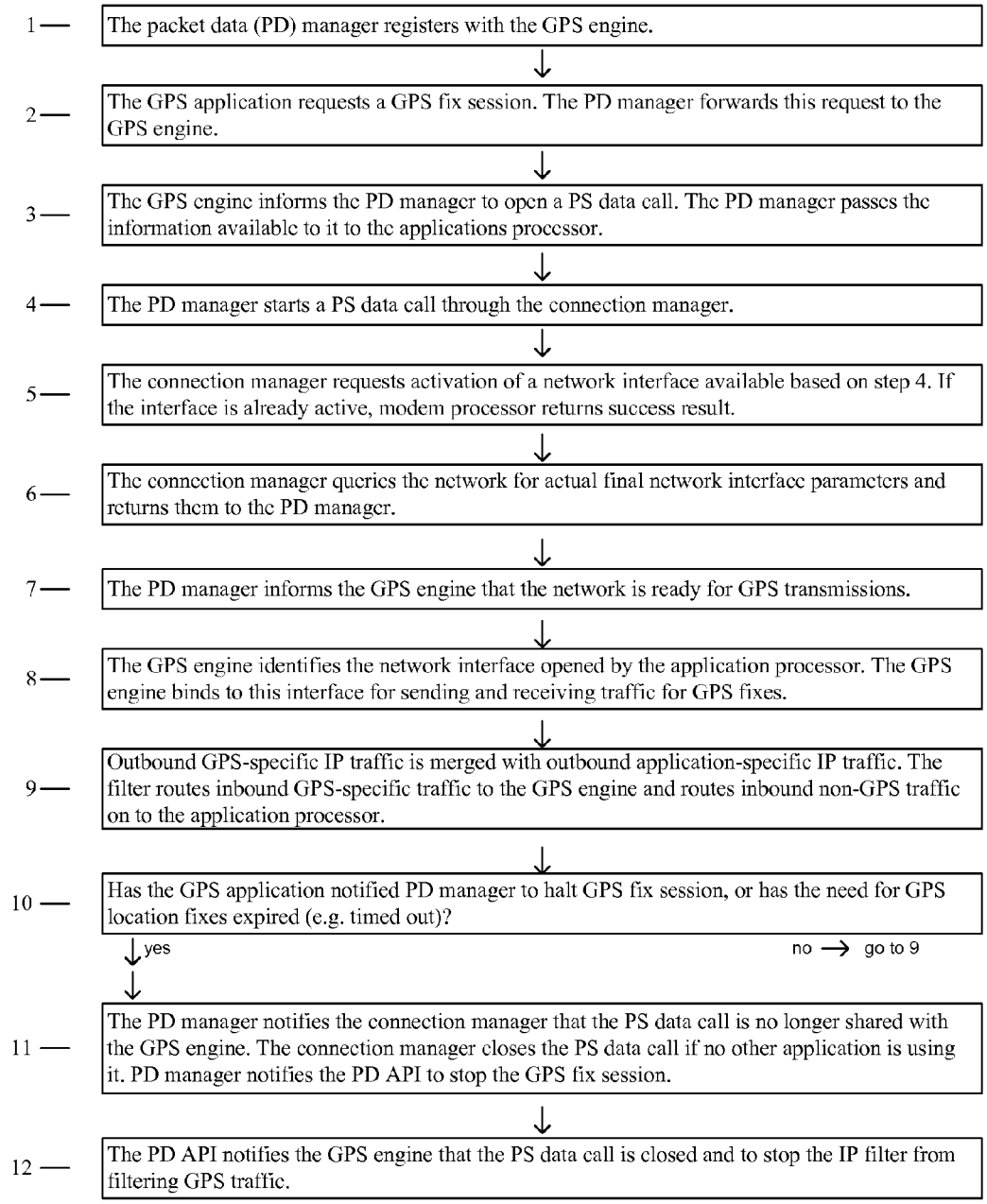
FIG. 2 is a process flow diagram illustrating the sequence of steps for an embodiment of the invention.
Figure 3B:
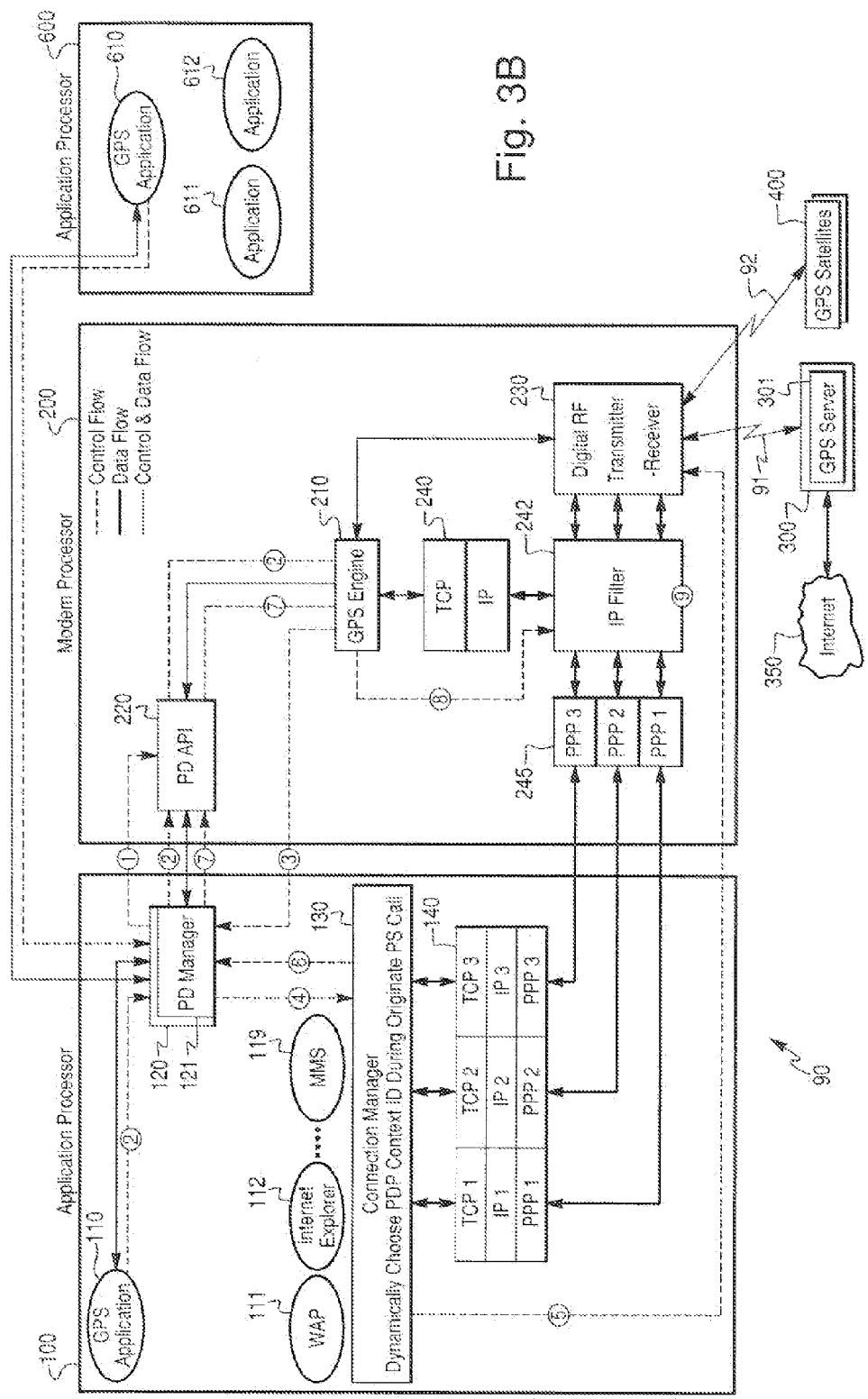

Referring to FIGS. 3A and 3B, an embodiment may include a GPS interface 121 which shares GPS location information from the GPS engine 210 among multiple GPS applications 110, 115, 610. The shared GPS interface 121 may simply be an extension of the packet data manager 120. For example, a first GPS application program, such as application program 110 of FIG. 3A or 3B, may establish a GPS location fix session as described above in connection with FIG. 2, steps 1 through 8. Then, other GPS applications 115, 610 may access the available location information through calls to the shared GPS interface 121 as shown in FIGS. 3A and 3B, respectively. Because one application, such as GPS application 110, starts the GPS service through the packet data manager 120, as in step 2 of FIG. 2, it may be appropriate for the packet data manager 120 to be extended with the shared GPS interface 121, as shown in FIGS. 3A and 3B. The shared GPS interface 121 may present a managed, high-level, sharable, virtual GPS resource, which hides how GPS is implemented. In other words, the interface would be the same as when a fully self-standing GPS processor is present.

In other alternative embodiments multiple GPS applications may be running simultaneously. In such instances, a packet switched data call for the GPS engine 210 may already be active. This may be because a first GPS application 110 has already precipitated the connection, when another GPS application 115 or 610 requests GPS service. In this case, the packet data manager 120, or more specifically the shared GPS interface 121, can simply return a success status to a GPS application 115 or 610 when further GPS service is requested.

Figure 4A:
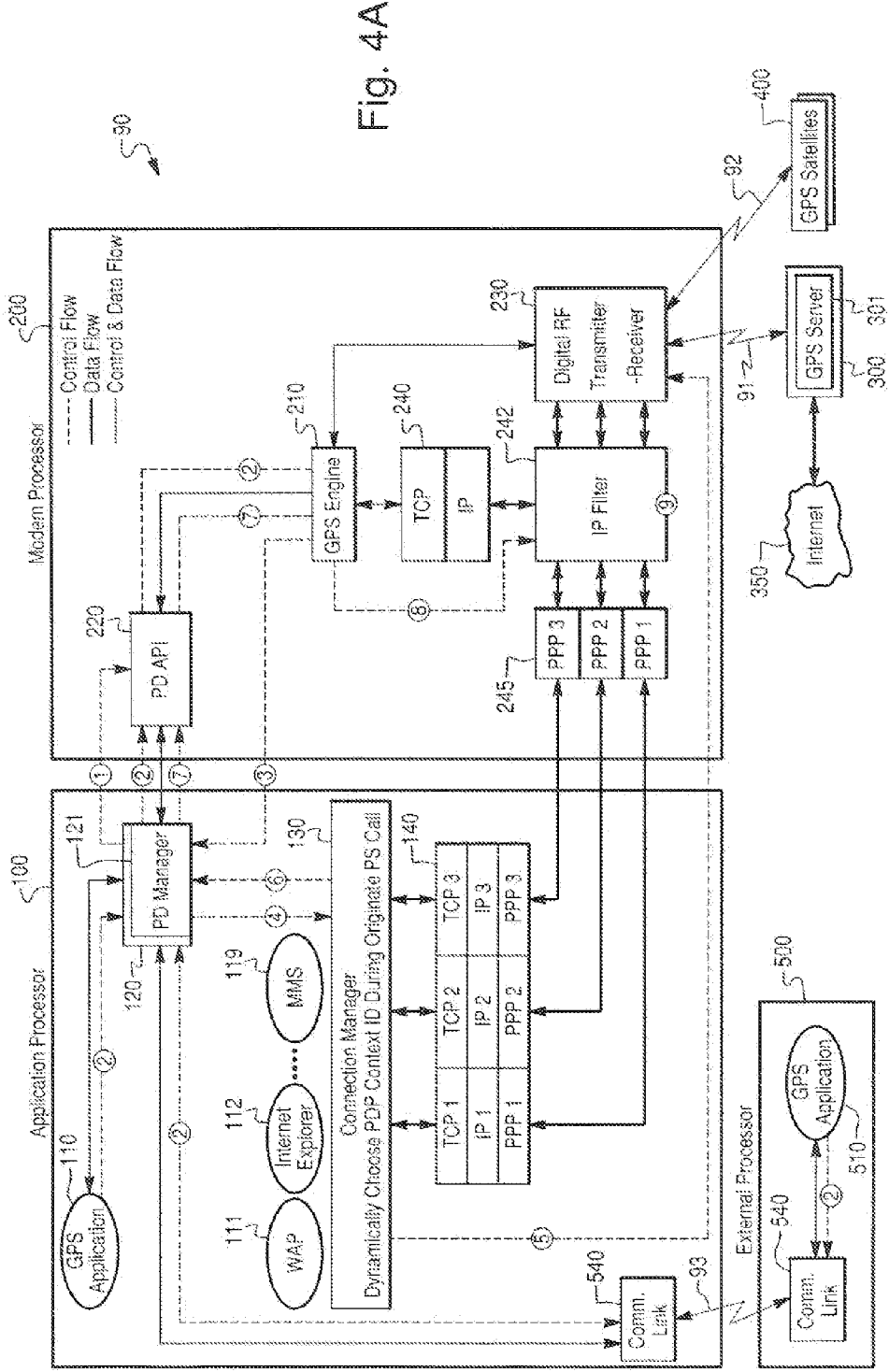
Figure 4B:
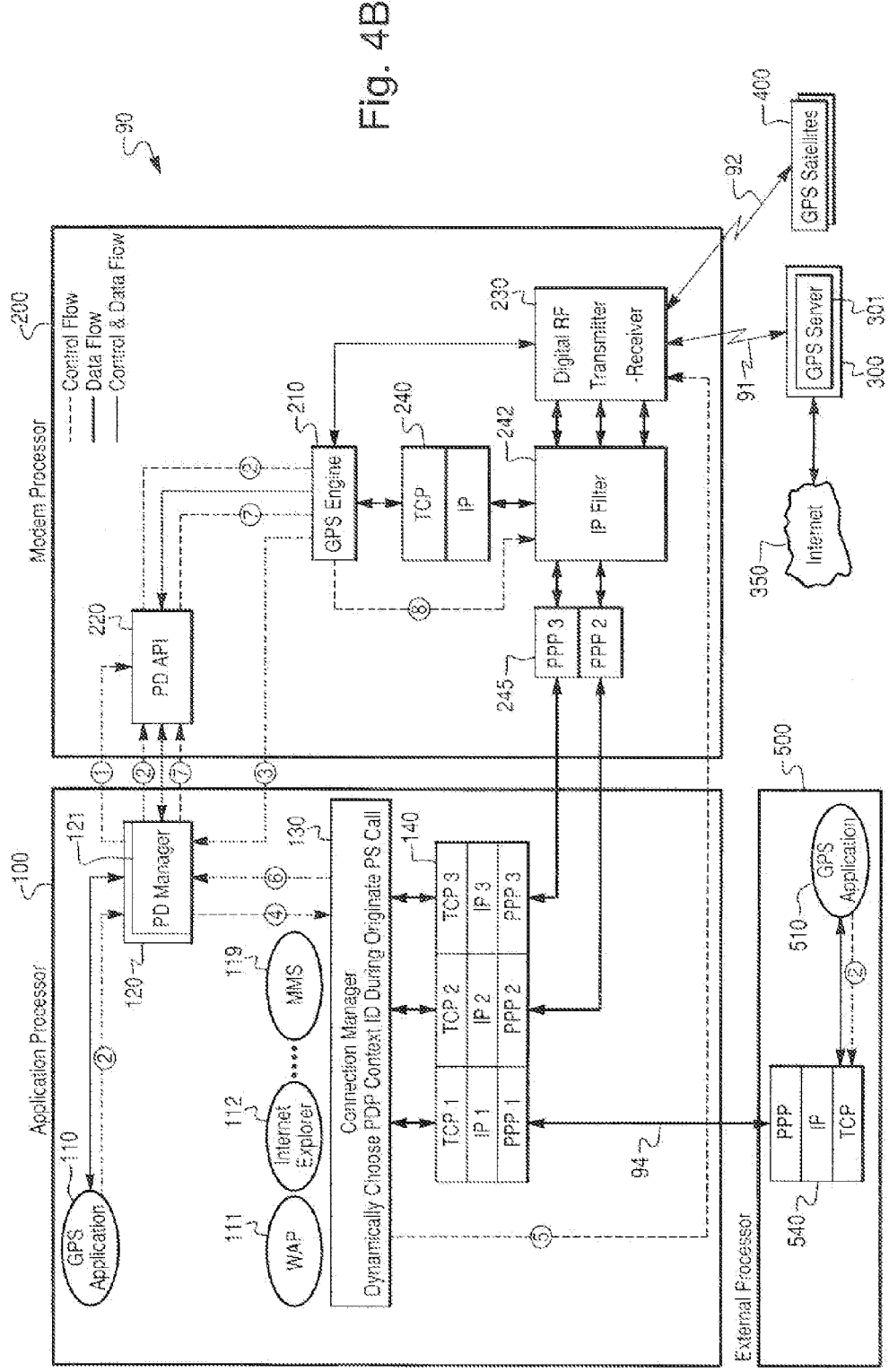
Figure 5:
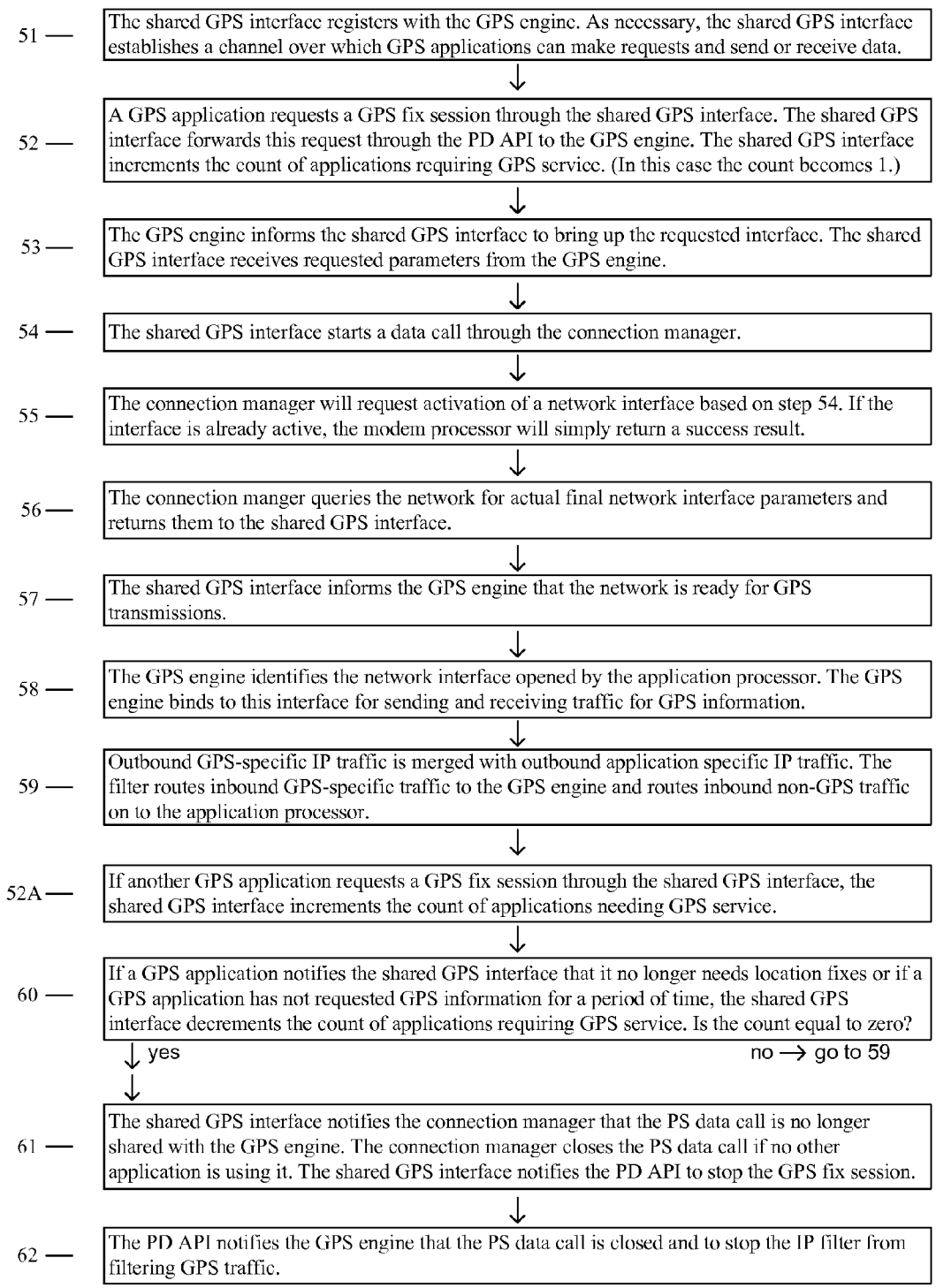
FIG. 5 is a process flow diagram illustrating the sequence of steps for an embodiment with one or more GPS applications.

FIG. 5, together with FIGS. 3A, 3B, 4A, and 4B, illustrates the sequence of steps of an alternative embodiment that may initiate and manage a shared packet data connection to the network and support two or more GPS applications. In step 51, the shared GPS Interface 121 requests service from the GPS engine 210 through the packet data applications programming interface (PD API) 220 in the modem processor 200. The shared GPS interface 121 may obtain communication parameters from the GPS Engine 210 through the PD Manager 120 and PD API 220. These communication parameters may specify the provisioned network connections to a GPS server, the desired interface family type, or whether a GPS fix session is already in progress. Also, an embodiment may require initialization of a channel to the shared GPS interface 121. This control flow step 51 begins the management of packet switched data connections.

In step 52, a user may activate an application stored within the mobile device 90 which requires the GPS location of the mobile device 90. By activating a GPS application 110, a request is sent to the shared GPS interface 121 to initiate a GPS location fix session to determine the location of the mobile device 90. The packet data manager 120 in turn may send a signal to the packet data API 220 so that the request to determine the location of the mobile device 90 is forwarded to the GPS engine 210.

In step 53, the GPS engine 210 requests initiation of a packet switched data call. To do so, the GPS engine 210 signals the shared GPS interface 121 to initiate the requested interface (CDMA, UMTS, WLAN, . . . ). The requested interface (such as a provisioned UMTS PDP context) is one which is appropriate to connect the GPS engine 210 to a GPS server 301 over the wireless communications network 300. The GPS engine 210 may provide the shared GPS interface 121 with the requested interface name, family type, and technology to perform the packet switch data call. Besides specifying CDMA, UMTS, WLAN, etc., the GPS engine 210 may also request a specific IP version (IPv4, IPv6, etc.) for example. For UMTS in particular, the GPS engine 210 may provide the APN name, the PDP type, the desired QoS (quality of service), etc. as parameters of the interface request. Next in step 54, the shared GPS interface 121 requests initiation of a packet switched data call through the connection manager 130. The data call may be made using a combination of the parameters obtained from GPS engine 210 in step 53.

Next in step 55, the connection manager 130 initiates activation of the data call to an appropriate available data network connection through the RF transceiver (transmitter-receiver) 230 based on the selection parameters provided by the shared GPS interface 121 in step 54. The appropriate available data network connection is activated by the modem processor 200 based on the parameters provided by the shared GPS interface 121 in step 54. The parameters provided by the shared GPS interface 121 may be different each time a data call is initiated. The parameters may vary depending on the location of the mobile device 90 and the available network or networks.

In step 56, once an appropriate network interface connection 91 is active through the RF transceiver unit 230, the connection manager 130 queries the wireless communications network 300 for final interface parameters and returns this information (APN, Device IP address, Type of call) to the shared GPS interface 121.

In step 57, the shared GPS interface 121 informs the GPS engine 210 via the packet data API 220 that the packet switched data call was successfully opened. The shared GPS interface 121 then provides the GPS engine 210 via the packet data API 220 with the necessary data network connection information for the GPS engine 210 to access the GPS server 301. The data network connection information for the GPS engine 210 may include the connection request information generated above in step 53. This connection request information may include the interface name/technology (CDMA, UMTS, WLAN, etc.), the interface family (IPv4, IPv6, etc.), and the interface specific information (for UMTS, the APN name, the PDP type, the QoS, the domain name, the services supported by domain, etc.). In addition, the data network connection information may include the interface IP address that was assigned for the data call session.

In step 58, the GPS engine 210 uses the network interface parameters described above in step 57 to uniquely identify the network interface brought up using the network information from the shared GPS interface 121 of the application processor 100. The GPS engine 210 binds to the network interface for sending and receiving IP traffic for GPS location fixes through TCP/IP communication stack 240. The filter 242 is configured to filter and route data packets of a specific form through communication stack 240 and all others to the particular communication stack 140 of the application sharing the network connection.

In step 59, the network GPS information is automatically extracted from the IP data traffic using the IP data filter 242 of the TCP/IP communication stack 240. That is, GPS-related received data traffic is stripped out, or filtered, by the IP data filter 242 and routed to the GPS engine 210. Specifically, every incoming data packet of an expected, specific form is routed to the GPS engine 210 through the communication stack 240 and not forwarded on to the application processor 100. Any other data packet received on the same data network connection is not routed through communication stack 240 but is routed to the application processor 100, such as through a PPP interface 245. The routing may occur transparently to the user. All data transmitted by the GPS engine 210 is merged, or interleaved, with data transmitted from the application processor 100 over the same data network connection.

At this point in step 52A, a second GPS application program 115 of FIG. 3A, or application program 610 of FIG. 3B, begins execution and requests GPS location fixes through the shared GPS interface 121. In response, the shared GPS interface 121 increments a count of applications currently requiring GPS location fix sessions. Step 52A can occur at any other time in the process, and is placed as it is in FIG. 5 for illustration purposes only. Further, a third GPS application could similarly be initiated by a user and require service through the shared GPS interface 121 at any time.

The purpose of the shared GPS interface 121 is to manage and synchronize all requests for GPS services. The shared GPS interface 121 and the packet data API 220 in effect present a virtual, shared GPS service. The shared GPS interface 121 may be implemented by the packet data manager 120. Alternatively, the shared GPS interface 121 may be implemented by augmenting the packet data API 220, however, locating the GPS interface 121 within the packet data API 220 may limit the accessibility of the GPS interface by the application 610 of FIG. 3B or from the application 519 of FIGS. 4A and 4B.

In step 60, one of the GPS applications 110, 115, or 610 currently active determines whether it no longer needs the services of the shared GPS interface 121. This may be because that particular GPS application 110, 115, or 610 has ceased executing or has been inactive for a specified period of time. In this case, the count of applications utilizing the shared GPS interface 121 is decremented by one. If the count is not zero, the shared GPS interface 121 will continue supporting the other GPS applications currently needing GPS location fixes, continuing to perform step 59.

If the count of active GPS applications, as decremented by the shared GPS interface 121, is zero, step 61 may then be executed. In step 61, the shared GPS interface 121 notifies the connection manager 130 that the packet switched data call is not longer required to be shared with the GPS engine 210. If no other application is currently sharing the packet switched data call with the GPS engine 210, the connection manager 130 terminates the data call. In any case, the shared GPS interface 121 notifies the packet data API to stop the GPS fix session, in step 62. Step 62 may include deactivating the IP data filter 242 in the communication stack 240, since there may no longer be any GPS related data packets to be filtered out.

FIGS. 4A and 4B illustrate additional alternative embodiments. In addition to the application processor 100, there may be at least one external processor 500, such as a laptop computer or a PDA. The external processor 500 may be linked with the multiprocessor mobile device 90 by means of a cable or a wireless link 93 or 94, such as Ethernet, USB, Firewire, Bluetooth, or some proprietary technology. In the embodiment illustrated in FIG. 4A, a dedicated communication link transceiver 540 is included on either end of the communication link 93. In the embodiment illustrated in FIG. 4B, an existing communication stack 140 is included in the application processor 100 for communicating over a channel 94 with the communications protocol stack 540 of the external processor 500. For illustration purposes, FIGS. 4A and 4B simply show only one GPS application 510. However, as with the application processor 100, multiple GPS applications may be executed on the external processor 500. The external processor 500 may be at least as complex as the application processor 100. That is, the external processor 500 may also include additional software components such as the various software components shown for the application processor 100.

FIGS. 4A and 4B show different kinds of communication between the external processor 500 and the application processor 100. Further, FIG. 4A shows control flow 2 and data flow between the GPS application 510 and the shared GPS interface 121. A GPS application 510 running in the external processor 500 can request GPS service from the shared GPS interface 121 by way of a communication link 540 and the communication channel 93. This arrangement may be used, for example, where the communication drivers 540 use a non-TCP/IP protocol, such as Bluetooth or USB.

FIG. 4B shows control flow 2 and data flow between TCP/IP communication stacks 140 and 540. This arrangement may be used where the communication channel 94 uses standard a TCP/IP network protocol. In this case, the packet data manager 120 through the connection manager 130 must establish a local connection, such as a TCP1/IP1/PPP1 connection 140 to the external processor 500. Then, the GPS application 510 uses this connection to send or receive requests and data to the shared GPS interface 121.

The GPS application 510 is assumed to be a GPS-related application in order to show how it relates to the GPS engine 210 and the various software components of the application processor 100. Except for the change in the control and data paths between the GPS application 510 and the shared GPS interface 121, the steps executed by the embodiments illustrated by FIGS. 4A and 4B may be the same as those in FIG. 5. The steps of FIG. 5 set up the GPS engine for sharing a packet switched data call, with an application already connected to a network over that packet switched data call. Embodiments of FIGS. 4A and 4B may specifically need to configure the communication channels 93 or 94, respectively, between the application processor 100 and the external processor 500. This is performed in step 51 of FIG. 5.

Figure 6:
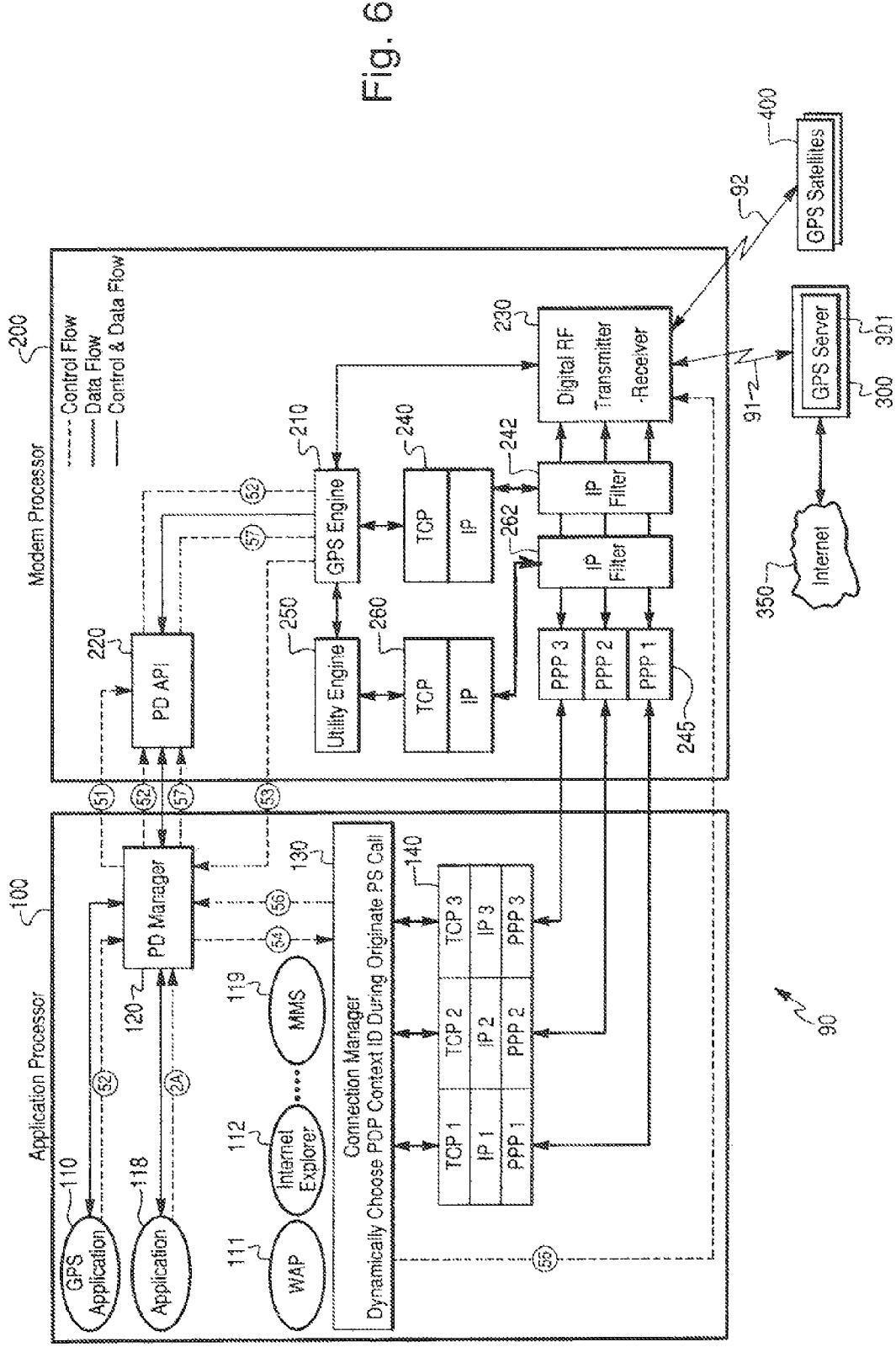
FIG. 6 illustrates a system block diagram of an alternative embodiment with one or more system programs on a modem processor which share a packet data call with an application processor.

FIG. 6 illustrates another embodiment in which the modem processor 200 may be executing at least one utility engine 250 in addition to the GPS engine 210. FIG. 6 shows the GPS engine 210 managing the control and/or data flow to the additional utility engine 250. An additional utility engine 250 may have its own TCP/IP/filter stack 260. In particular, a utility engine 250 may be capable of filtering out of—or injecting into—the PPP stream data packets specifically relevant to that utility engine 250, similar to the way that the GPS Engine IP data filter 242 routes GPS specific data packets. Instead of a PPP protocol, a different protocol (not shown) can be running on the link layer of the communication stack 240 and/or 260, because both CDMA and UMTS also support sending IP data packets directly through a network data connection.

Other arrangements, interconnections, or numbers of GPS and utility engines are possible. For example, in FIG. 7 the GPS engine 210 and the utility engine 250 have individual communication stacks but share a single composite filter 270. With a composite filter, data extracted from the stream of data packets can be routed for the appropriate destination, namely the TCP/IP stack of each processor and the GPS engine 210, the utility engine 250, or another application in the application processor 100 sharing the data connection.

Figure 8:
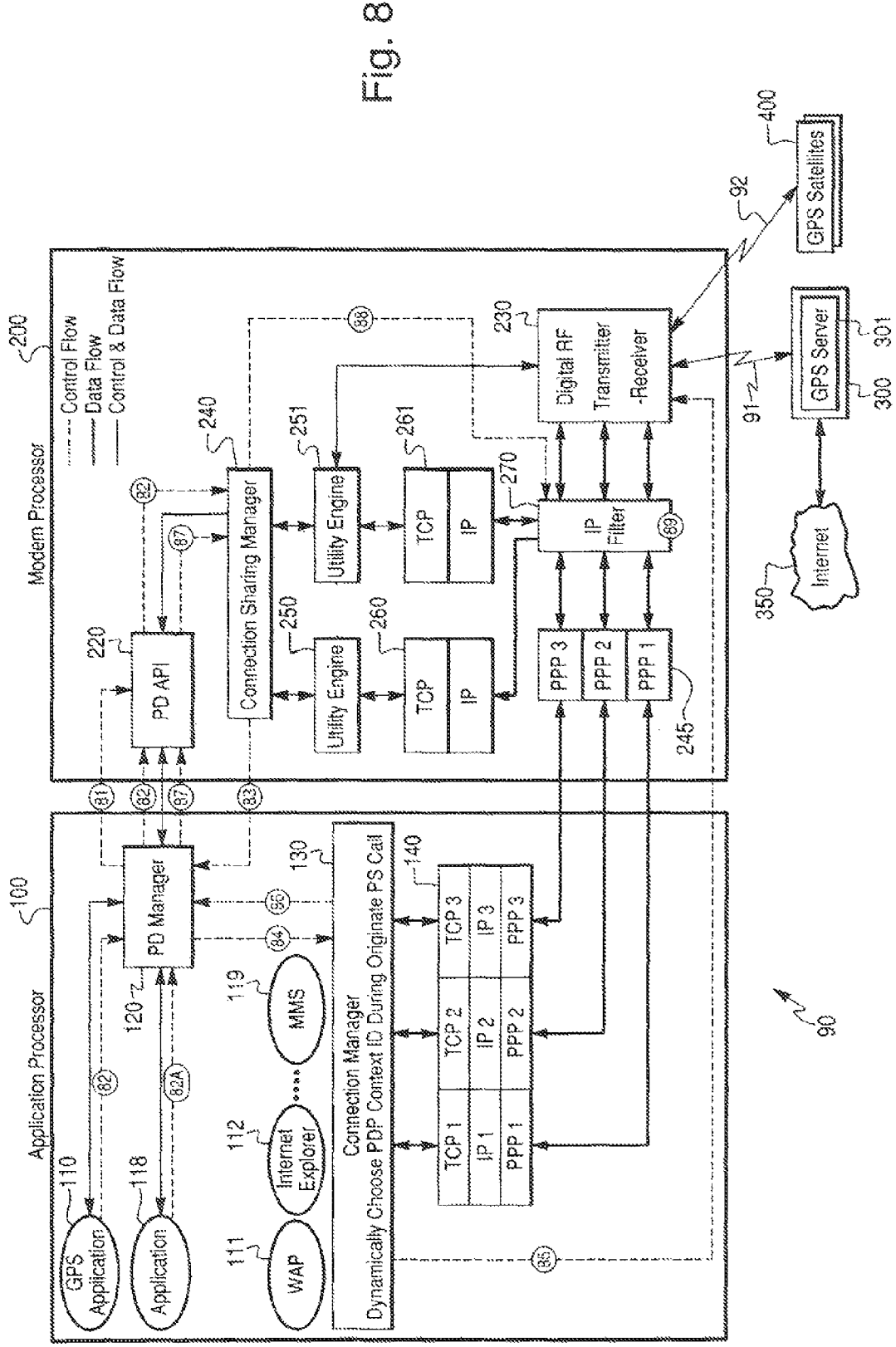
FIG. 8 illustrates a system block diagram of an embodiment including an application processor managing multiple data network connections and a modem processor having two utility engines.

FIG. 8 is a block diagram of another embodiment of a mobile device 90 which does not have a GPS engine running on the modem processor 200. Instead of a GPS engine, there is at least one non-GPS utility engine 250 (251), which may require access to a network connection through a communication stack 260 (261). As with the GPS engine, the non-GPS utility engine 250 (251) may need to share one or more active data network connections with an application 116 or 118 running on the at least one application processor 100. The reason for sharing a data network connection may be as described before. That is, only one IP address may be assigned to the device during PDP activation from a given domain. However, there may need to be simultaneous data transfers from a utility server 302 on the network 300 to an application program 116 or 118 as well as to the utility engine 260. There also may need to be data transfers in the opposite direction over the shared data network connection. To share a data network connection with an application program 116 or 118, the utility engine 250 or 251 may use an IP data filter 270 to monitor packet data traffic over the shared connection. The IP data filter 270 recognizes data packets relevant to the utility engine based upon specific, expected address, format or content. For example, the IP data filter is configured to watch for and separate out utility-related data packets from the utility server 302 based upon the source address in the data packet. The utility-related format or content may include a TCP or UDP port number and IP address or other unique content which identifies the data packet as originating from the utility server 302. The IP data filter 270 routes recognized utility-related data packets to the utility engine 250 or 251 all data packets relevant to the utility engine and routes all other data packets to the applications sharing the data network connection. Alternatively, each utility engine 250 or 251 may have its own separate IP data filter, as was the case in FIG. 6.

Referring to FIGS. 8 and 9, a sequence of steps for an alternative embodiment is illustrated in conjunction with the system for performing the method steps. In step 71, the packet data manager 120 registers its presence with connection sharing manager 290 through the packet data applications programming interface (PD API) 220 in the modem processor 200. The packet data manager 120 may obtain communication parameters from the connection sharing manager 290 through the packet data manager 120 and PD API 220. These communication parameters may specify the provisioned data network connections to a utility-related server 302 required by a utility engine 250, 251 for which it is managing shared data network connections. The parameters provided to the packet data manager 120 may include the desired interface family type, or whether utility services are already in progress. This control flow step 71 begins the management of packet switched data connections.

In step 72, a user may activate an application 116 which requires services from a utility engine 250, 251. By activating an application 116, a request is sent to the packet data manager 120 to initiate services from a utility engine 250, 251. The packet data manager 120 in turn may send a signal to the packet data API 220 so that the utility service request is forwarded to the connection sharing manager 290, which in turn may forward the request to a utility engine 250, 251 which provides the requested services. If more than one application at a time may request service from a particular utility engine 250, 251, the PD manager 120 or the connection sharing manager 290 may maintain a count of the number of applications requiring such service for each utility engine 250, 251.

In step 73, the connection sharing manager 290 requests initiation of a packet switched data call. To do so, the connection sharing manager 290 signals the packet data manager 120 to initiate the requested interface (CDMA, UMTS, WLAN, . . . ). The requested interface (such as a provisioned UMTS PDP context) is one which will connect the appropriate utility engine 250, 251 to a utility server 302 over the wireless communication network 300. The connection sharing manager 290 may provide the packet data manager 120 with the requested interface name, family type, and technology to perform the packet switch data call. Besides specifying CDMA, UMTS, WLAN, etc., the connection sharing manager 290 may also request a specific IP version (IPv4, IPv6, etc.) for example. For UMTS in particular, the connection sharing manager 290 may provide the APN name, the PDP type, the desired QoS (quality of service), etc. as parameters of the interface request. Next in step 74, the packet data manager 120 requests initiation of a packet switched data call through the connection manager 130. The data call may be made using a combination of the parameters obtained from the connection sharing manager 290 in step 73.

Next in step 75, the connection manager 130 initiates activation of the data call to an appropriate available network interface through RF transceiver (transmitter-receiver) 230 based on the selection parameters provided by the PD manager 120 in step 74. The appropriate available interface is activated by the modem processor 200 based on the parameters provided by the packet data manager 120 in step 74. The parameters provided by the packet data manager 120 may be different each time a data call is initiated. The parameters may vary depending on the available network or networks.

In step 76, once an appropriate date network connection 91 is active through the RF transceiver unit 230, the connection manager 130 queries the wireless communications network 300 for final interface parameters and returns this information (APN, Device IP address, Type of call) to the packet data manager 120.

In step 77, the packet data manager 120 informs the connection sharing manager 290 via the packet data API 220 that the packet switched data call was successfully opened. The packet data manager 120 then provides the utility engine 250, 251 through the packet data API 220 and the connection sharing manager 290 with the necessary network information to access the utility server 302. The network information for the connection sharing manager 290 may include the connection request information generated above in step 73. This connection request information may include the interface name/technology (CDMA, UMTS, WLAN, etc.), the interface family (IPv4, IPv6, etc.), and the interface specific information (for UMTS, the APN name, the PDP type, the QoS, the domain name, the services supported by domain, etc.). In addition, the network information may include the interface IP address that was assigned for the data call session.

In step 78, the connection sharing manager 290 uses the network interface parameters described above in step 77 to uniquely identify the network interface brought up using the network information from the PD manager 120 of the application processor 100. The connection sharing manager 290 binds the related utility engine 250, 251 to the network interface for sending and receiving IP traffic from the utility server 302 through TCP/IP communication stack 260, 261. The connection sharing manager 290 configures the IP data filter 270 to examine and route data packets of a specific form through communication stack 260, 261 and all others to the particular communication stack 140 of the application sharing the network connection.

In step 79, the inbound data from utility server 302 is automatically extracted from the IP data traffic by the IP data filter 270. That is, utility-related received data traffic is stripped out, or filtered, by the IP data filter 270 and routed to the appropriate utility engine 250, 251 as so configured by the connection sharing manager 290. Specifically, every incoming data packet of an expected, specific form or from the utility server 302 is routed to the connection sharing manager 290 through the communication stack 260 or 261. That data packet is not forwarded on to the application processor 100. Any other data packet received on the same network connection is not routed through communication stack 260, 261 but is routed to the application processor 100, such as through a PPP interface 245. The routing may occur transparently to the user. All data transmitted by the utility engine 250 or 251 is merged, or interleaved, with data transmitted from the application processor 100 over the same data network connection.

At this point in step 72A, another application program 118 may begin execution and may request modem utility services through the PD manager 120. In response, the packet data manager 120 may increment a count of applications currently requiring modem utility services. Alternatively, this count may be maintained by the connection sharing manager. Step 72A can occur at other times in the process, and is placed as it is in FIG. 9 for illustration purposes only. Further, a third application, if it executes, could similarly be initiated by a user at any time in this process and require service through the packet data manager 120. The purpose of the packet data manager 120 is to manage and synchronize all application requests for the utility services.

Step 80 determines whether one of the currently active applications 116, 118 no longer needs the utility services. This may be because that particular application 116, 118 has ceased executing or has not used the services for a specified period of time (time-out period). Alternatively, the application 116, 118 may explicitly notify the PD manager that the utility services are no longer required. In either case, the packet data manager 120, or alternatively the connection sharing manager 290, decrements the count of applications utilizing the utility engine 250, 251 providing the unneeded services. If the count is not zero, the packet data manager 120 will continue supporting the other applications currently needing the service, so the process continues at step 79.

If the count of active applications using a particular utility engine 250, 251, as decremented by the packet data manager 120, is zero, step 81 may then be executed. In step 81, the packet data manager 120 notifies the connection manager 130 that the packet switched data call is not longer required to be shared with the connection sharing manager 290. If no application is currently sharing the packet switched data call with the connection sharing manager 290, the connection manager 130 terminates the data call. In any case, the PD manager 120 notifies the connection sharing manager 290 through the packet data API 220 to stop the particular utility engine 250, 251 in step 82. Step 82 may include reconfiguring the IP data filter 270, since there may no longer be any utility-related data packets from utility server 302 to be filtered out and routed to the particular utility engine 250, 251.

The hardware used to implement the steps of FIGS. 2, 5, and 9 may be processing elements and memory elements configured to execute a set of instructions, wherein the set of instructions are for performing method steps corresponding to the above events. Alternatively, some steps may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the present invention has been disclosed with reference to specific example embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

We claim:

1. A method for sharing a network connection between a first utility engine and a first application program on a mobile multiprocessor telecommunications device, comprising:
   implementing the first utility engine on a modem processor of the mobile multiprocessor telecommunications device, wherein the first utility engine receives data from a first utility server and provides services to one or more applications running on a separate application processor of the mobile multiprocessor telecommunications device;
   executing the first application program on the application processor of the mobile multiprocessor telecommunications device, wherein the first application program requires access to a data network connection over which the services are provided by the first utility server;
   selecting the data network connection over which the services are provided by the first utility server from a plurality of network connections in communication with the first utility engine;
   binding the first utility engine to the selected data network connection to transmit and receive first utility-related data to and from the first utility engine; and
   enabling the first application program to transmit and receive data over the network connection bound to the utility engine by:
      identifying, with a software module on the modem processor, first utility-related data packets received on the bound network connection based on a format of the received data packets;
      routing the identified first utility-related received data packets to the first utility engine;
      routing other data packets received on the bound network connection to the first application program; and
      merging outgoing data packets from the first utility engine and the first application program for transmission on the bound network connection.

2. The method of claim 1, further comprising sharing information generated by the first utility engine with the first application program.

3. The method of claim 1, further comprising:
   binding a second utility engine to the bound network connection which is also in communication with a second utility server and which can transmit and receive utility-related data to and from the second utility engine.

4. The method of claim 3, further comprising:
   identifying second utility-related data packets received on the bound network connection; and
   routing the identified second utility-related data packets to the second utility engine, wherein merging outgoing data packets merges outgoing data packets from the first utility engine, the second utility engine and the first application program for transmission on the bound network connection.

5. The method of claim 1, further comprising sharing information generated by the first utility engine with the first application program and a second application program.

6. The method of claim 3, further comprising sharing information generated by the second utility engine with the first application program and a second application program via a packet data manager.

7. The method of claim 1, wherein identifying first utility-related data packets received on the bound network connection comprises:
   monitoring data packets received on the bound network connection; and
   identifying the first utility-related data packets based upon a source address.

8. The method of claim 1, wherein identifying first utility-related data packets received on the bound network connection comprises:
   monitoring data packets received on the bound network connection; and
   identifying the first utility-related data packets based upon a content in the data packet.

9. The method of claim 1, wherein identifying first utility-related data packets received on the bound network connection comprises:
   monitoring data packets received on the bound network connection; and
   identifying the first utility-related data packets based upon a TCP or UDP port number.

10. The method of claim 1, wherein identifying first utility-related data packets received on the bound network connection comprises:
    monitoring data packets received on the bound network connection; and
    identifying the first utility-related data packets based upon an IP address.

11. The method of claim 1, further comprising discontinuing identifying first utility-related data packets received on the bound network connection when the first utility engine is disconnected from the network connection.

12. A mobile multiprocessor telecommunications device which communicates with a packet-switched network, comprising:
    first utility engine means for receiving data on a modem processor from a first utility server and providing services to one or more applications running on a separate application processor of the mobile multiprocessor telecommunications device;

means for executing a first application program that requires access to a data network connection over which the services are provided by the first utility server;

means for selecting the data network connection over which the services are provided by the first utility server from a plurality of network connections in communication with the first utility engine;

means for binding the first utility engine to the selected data network connection to transmit and receive utility-related data to and from the first utility engine; and means for enabling the first application program to transmit and receive data over the network connection bound to the first utility engine comprising:

means for identifying, with a software module on the modem processor, first utility-related data packets received on the bound network connection based on a format of the received data packets;

means for routing the identified first utility-related received data packets to the first utility engine;

means for routing other data packets received on the bound network connection to the first application program; and means for merging outgoing data packets from the first utility engine and the first application program for transmission on the bound network connection.

13. The mobile multiprocessor telecommunications device of claim 12, further comprising means for sharing information generated by the first utility engine with the first application program.

14. The mobile multiprocessor telecommunications device of claim 12, further comprising:

means for binding a second utility engine to the bound network connection which is also in communication to a second utility server which can transmit and receive utility-related data to and from the second utility engine.

15. The mobile multiprocessor telecommunications device of claim 14, further comprising:

means for identifying second utility-related data packets received on the bound network connection; and means for routing the identified second utility-related received data packets to the second utility engine, wherein the means for merging outgoing data packets includes means for merging outgoing data packets from the first utility engine, the second utility engine and the first application program for transmission on the bound network connection.

16. The mobile multiprocessor telecommunications device of claim 12, further comprising means for sharing information generated by the first utility engine with the first application program and a second application program.

17. The mobile multiprocessor telecommunications device of claim 14, further comprising means for sharing information generated by the second utility engine with the first application program and a second application program via a packet data manager.

18. The mobile multiprocessor telecommunications device of claim 12, wherein means for identifying first utility-related data packets received on the bound network connection comprises:

means for monitoring data packets received on the bound network connection; and means for identifying the first utility-related data packets based upon a source address.

19. The mobile multiprocessor telecommunications device of claim 12, wherein means for identifying first utility-related data packets received on the bound network connection comprises:

means for monitoring data packets received on the bound network connection; and means for identifying the first utility-related data packets based upon a content in the data packet.

20. The mobile multiprocessor telecommunications device of claim 12, wherein means for identifying first utility-related data packets received on the bound network connection comprises:

means for monitoring data packets received on the bound network connection; and means for identifying the first utility-related data packets based upon a TCP or UDP port number.

21. The mobile multiprocessor telecommunications device of claim 12, wherein means for identifying first utility-related data packets received on the bound network connection comprises:

means for monitoring data packets received on the bound network connection; and means for identifying the first utility-related data packets based upon an IP address.

22. The mobile multiprocessor telecommunications device of claim 12, further comprising means for discontinuing identifying first utility-related data packets received on the bound network connection when the first utility engine is disconnected from the network connection.

23. A non-transitory computer-readable medium in a multi-processor communications device having stored thereon processor executable software instructions configured to cause the multi-processor communications device to perform operations comprising:

receiving data in a first utility engine of a modem processor from a first utility server and providing services to one or more applications running on a separate application processor of the mobile multiprocessor telecommunications device;

executing a first application program that requires access to a data network connection over which the services are provided by the first utility server;

selecting the data network connection over which the services are provided by the first utility server from a plurality of network connections in communication with the first utility engine;

binding the first utility engine to the selected data network connection to transmit and receive utility-related data to and from the first utility engine; and enabling a first application program running on the application processor to transmit and receive data over the bound network connection by being configured to perform operations comprising:

identifying, with a software module on the modem processor, first utility-related data packets received on the bound network connection based on a format of the received data packets;

routing the identified first utility-related received data packets to the first utility engine;

routing other data packets received on the bound network connection to the first application program; and merging outgoing data packets from the first utility engine and the first application program for transmission on the bound network connection.

24. The non-transitory computer-readable medium of claim 23, wherein the stored processor executable software instructions are configured to cause a processor to perform operations further comprising:

enabling sharing information generated by the first utility engine with the first application program.

25. The non-transitory computer-readable medium of claim 23, wherein the stored processor executable software instructions are configured to cause a processor to perform operations further comprising:
  binding the second utility engine to the bound network connection which is also in communication with a second utility server which can transmit and receive utility-related data to and from the second utility engine.

26. The non-transitory computer-readable medium of claim 25, wherein the stored processor executable software instructions are configured to cause a processor to perform operations further comprising:
  identify second utility-related data packets received on the bound network connection;
  routing the identified second utility-related received data packets to the second utility engine; and
  merging outgoing data packets from the first utility engine, the second utility engine and the first application program for transmission on the bound network connection.

27. The non-transitory computer-readable medium of claim 25, wherein the stored processor executable software instructions are configured to cause a processor to perform operations further comprising:
  sharing information generated by the first utility engine with the first application program and a second application program.

28. The non-transitory computer-readable medium of claim 26, wherein the stored processor executable software instructions are configured to cause a processor to perform operations further comprising:
  sharing information generated by the second utility engine with the first application program and a second application program via a packet data manager.

29. The non-transitory computer-readable medium of claim 23, wherein the stored processor executable software instructions are configured to cause a processor to perform operations such that identifying first utility-related data packets received on the bound network connection comprises:
  monitoring data packets received on the bound network connection; and
  identifying the first utility-related data packets based upon a source address.

30. The non-transitory computer-readable medium of claim 23, wherein the stored processor executable software instructions are configured to cause a processor to perform operations such that identifying first utility-related data packets received on the bound network connection comprises:
  monitoring data packets received on the bound network connection; and
  identifying the first utility-related data packets based upon a content in the data packet.

31. The non-transitory computer-readable medium of claim 23, wherein the stored processor executable software instructions are configured to cause a processor to perform operations such that identifying first utility-related data packets received on the bound network connection comprises:
  monitoring data packets received on the bound network connection; and
  identifying the first utility-related data packets based upon a TCP or UDP port number.

32. The non-transitory computer-readable medium of claim 23, wherein the stored executable software instructions are configured to cause a processor to perform operations such that identifying first utility-related data packets received on the bound network connection comprises:
  monitoring data packets received on the bound network connection; and
  identifying the first utility-related data packets based upon an IP address.

33. The non-transitory computer-readable medium of claim 23, wherein the stored processor executable software instructions are configured to cause a processor to perform operations further comprising:
  discontinuing filtering first utility-related data packets received on the bound network connection when the first utility engine is disconnected from the network connection.

34. A multi-processor communications device, comprising:
  an application processor configured with application processor-executable instructions to perform operations comprising executing a first application program that requires access to a data network connection over which services are provided by a first utility server, and
  a modem processor coupled to the applications processor, wherein the modem processor is configured with modem processor-executable instructions to perform operations comprising:
    executing a first utility engine configured to receive data from the first utility server;
    selecting the data network connection over which the services are provided by the first utility server from a plurality of network connections in communication with the first utility engine;
    binding the first utility engine to the selected data network connection to transmit and receive first utility-related data to and from the first utility engine; and
    enabling the first application program to transmit and receive data over the network connection bound to the utility engine by:
      identifying first utility-related data packets received on the bound network connection based on a format of the received data packets;
      routing the identified first utility-related received data packets to the first utility engine;
      routing other data packets received on the bound network connection to the first application program; and
      merging outgoing data packets from the first utility engine and the first application program for transmission on the bound network connection.

35. The multi-processor communications device of claim 34, wherein the modem processor is configured with modem processor-executable instructions to perform operations further comprising sharing information generated by the first utility engine with the first application program.

36. The multi-processor communications device of claim 34, wherein the modem processor is configured with modem processor-executable instructions to perform operations further comprising:
  binding a second utility engine to the bound network connection which is also in communication with a second utility server and which can transmit and receive utility-related data to and from the second utility engine.

37. The multi-processor communications device of claim 36, wherein the modem processor is configured with modem processor-executable instructions to perform operations further comprising:
  identifying second utility-related data packets received on the bound network connection; and
  routing the identified second utility-related data packets to the second utility engine,
  wherein the modem processor is configured with modem processor-executable instructions such that merging outgoing data packets comprises merging outgoing data packets from the first utility engine, the second utility engine and the first application program for transmission on the bound network connection.

38. The multi-processor communications device of claim 34, wherein the modem processor is configured with modem processor-executable instructions to perform operations further comprising:
sharing information generated by the first utility engine with the first application program and a second application program.

39. The multi-processor communications device of claim 36, wherein the modem processor is configured with modem processor-executable instructions to perform operations further comprising:
sharing information generated by the second utility engine with the first application program and a second application program via a packet data manager.

40. The multi-processor communications device of claim 34, wherein the modem processor is configured with modem processor-executable instructions such that identifying first utility-related data packets received on the bound network connection comprises:
monitoring data packets received on the bound network connection; and
identifying the first utility-related data packets based upon a source address.

41. The multi-processor communications device of claim 34, wherein the modem processor is configured with modem processor-executable instructions such that identifying first utility-related data packets received on the bound network connection comprises:
monitoring data packets received on the bound network connection; and
identifying the first utility-related data packets based upon a content in the data packet.

42. The multi-processor communications device of claim 34, wherein the modem processor is configured with modem processor-executable instructions such that identifying first utility-related data packets received on the bound network connection comprises:
monitoring data packets received on the bound network connection; and
identifying the first utility-related data packets based upon a TCP or UDP port number.

43. The multi-processor communications device of claim 34, wherein the modem processor is configured with modem processor-executable instructions such that identifying first utility-related data packets received on the bound network connection comprises:
monitoring data packets received on the bound network connection; and
identifying the first utility-related data packets based upon an IP address.

44. The multi-processor communications device of claim 34, wherein the modem processor is configured with modem processor-executable instructions to perform operations further comprising discontinuing identifying first utility-related data packets received on the bound network connection when the first utility engine is disconnected from the network connection.

* * * * *